June 16, 1942.   B. G. CARLSON   2,286,895
LOCK NUT
Filed April 16, 1941
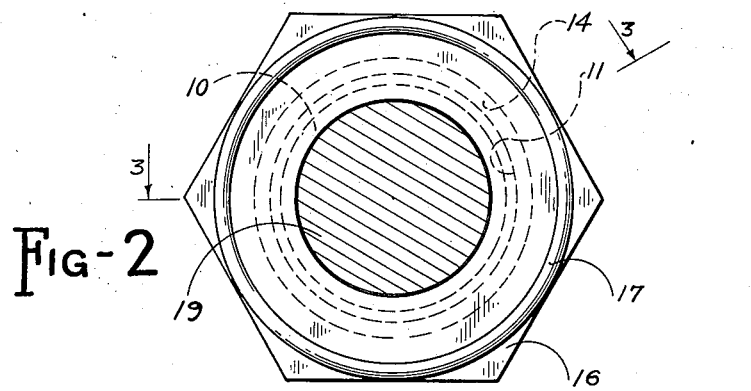
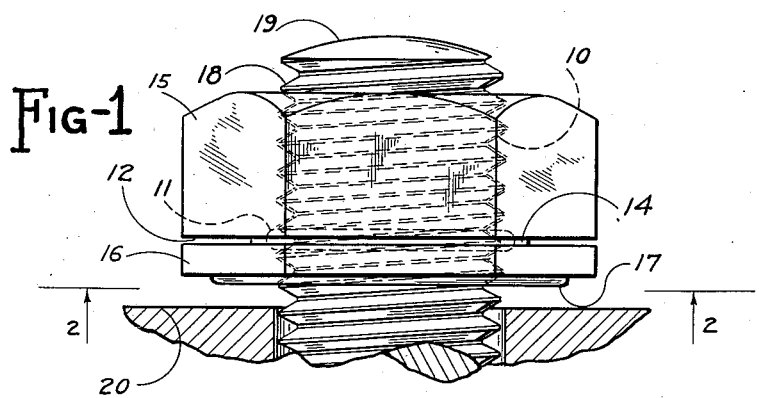
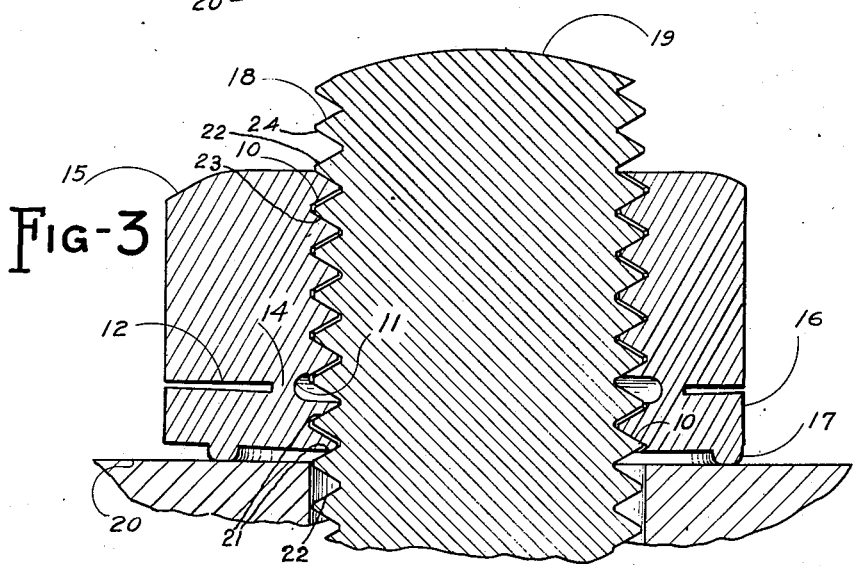
INVENTOR.
BERT G. CARLSON
BY Richey & Watts
ATTORNEYS Patented June 16, 1942

2,286,895

UNITED STATES PATENT OFFICE 2,286,895

LOCK NUT

Bert G. Carlson, Willobee, Ohio, assignor to The Weatherhead Company, Cleveland, Ohio, a corporation of Ohio Application April 16, 1941, Serial No. 388,839

2 Claims. (Cl. 151—21)

This invention relates to improvements in self-locking nuts wherein the nut and locking portion are formed as an integral structure.

One of the objects of the present invention is the provision of a nut which, upon engagement with an abutting surface, is distorted or deformed to increase the frictional engagement between the nut and a coacting bolt or stud. Another object is to provide such a nut wherein the thread in different portions thereof, will engage opposite faces of the thread on the coacting bolt for locking the nut thereto. Another object is to provide a simple and compact nut embodying a locking portion. Further objects are to provide such a nut which is light in weight, economical of manufacture, reliable and efficient in service and which is capable of ready assembly upon a bolt.

Other objects and advantages more or less ancillary to the foregoing, and the manner in which all the various objects are realized, will appear in the following description, which considered in connection with the accompanying drawing, sets forth the preferred embodiment of the invention.

I preferably accomplish the above and other objects of the present invention by providing a nut with an integrally formed locking portion having a thread of the same pitch as the nut, said locking portion having a circular bead on the end thereof, the engagement of the bead with a work surface or abutment as the nut is tightened, resulting in the distortion of the locking portion and effecting the securement of the nut upon the coacting bolt. Preferably the nut has formed therein adjacent an end thereof concentric internal and external grooves which are spaced apart to form a connecting web which constitutes a fulcrum for the locking portion. The nut, before being tightened into engagement with an abutting surface, is formed preferably to spin freely on a bolt or stud under finger manipulation, thereby requiring a minimum of use of a tightening wrench.

Referring to the drawing wherein a preferred embodiment of the invention is illustrated, Fig. 1 is a vertical sectional view of a nut embodying the present invention; Fig. 2 is a plan view of the nut taken on a plane indicated by line 2—2 of Fig. 1; and Fig. 3 is an enlarged transverse sectional view of the nut secured upon a bolt, the view as indicated by line 3—3 of Fig. 2.

Referring to Fig. 1, the locknut is preferably formed from a blank of ductile material having sufficient elasticity to permit flexing of one portion of the locknut with respect to the other portion. The blank is provided with an opening along the vertical axes thereof which is tapped to provide a thread 10 of a constant pitch extending from one end of the blank to the opposite end.

The locknut is formed, adjacent its lower or work engaging end, with an internal annular groove 11 which is spaced from a concentric external annular groove 12 by a relatively thin connecting web 14. The formation of the grooves 11 and 12 in the locknut divides the blank into a nut or body portion 15 and a locking portion 16, with the locking portion being of less thickness than the nut portion. The locking portion 16 is preferably of such a thickness as to embrace about one and one-half convolutions of the thread 10. A circular bead 17 is formed on the lower end of the locking portion 16 adjacent its outer edge and is adapted to engage the work or abutting surface 20 as the nut is threaded on a bolt 19.

In the use of the locknut, the thread 10 of the body and locking portions is adapted to engage a thread 18 formed on the coacting bolt 19 with the locking portion 16 preceding the body portion 15 as the locknut is threaded thereon. The threads are preferably dimensioned so that the nut may be spun on easily, as with the fingers until the circular bead 17 comes into engagement with the surface 20, Fig. 3. Thereafter, the locknut is tightened upon the bolt 19 in the usual manner, as by a wrench. During the tightening of the locknut the locking portion 16 will become distorted as it fulcrums about the connecting web 14. The pivotal movement of the locking portion 16 about the web 14 causes the internal groove 11 to open or become wider while at the same time the outer edges of the external groove 12 are closed or narrowed, as illustrated in Fig. 3.

The distortion or pivotal movement of the locking portion 16 about the connecting web 14 causes the leading face 21 of the portion of the internal nut thread 10 embraced by the locking portion 16 to engage the following face 22 of the coacting bolt thread 18. Thus as the bolt is held and the nut is spun thereon the leading face 21 of the portion of the internal nut thread 10 embraced by the locking portion 16 will intimately engage the following face 22 of the bolt thread 18, while the following faces 23 of the nut thread 10 in the portion 15 of the nut will intimately engage the leading faces 24 of the coacting bolt thread 18. However, if the nut is held and the bolt 19 is turned the following faces 22 of the bolt thread 18 become the leading faces and the following faces 23 of the internal nut thread 10 becomes the leading faces. Thus by holding the nut and turning the bolt the leading face of the bolt thread 18 will engage the following face of the nut thread 10 embraced by the locking portion 16 and the following faces of the bolt thread 18 will engage the leading face of the nut thread 10 embraced by the portion 15 of the nut. This engagement of the threads in the locking portion 16 and the body portion 15 with opposite faces of the thread 18 of the bolt locks or clamps the nut upon the bolt and this frictional engagement effectively resists the action of vibrations and shocks which might otherwise loosen the nut upon the bolt.

In removing the locknut from the bolt the initial turning of the locknut upon the bolt is accomplished through the use of a wrench applied to the body portion 15. After the locknut is initially loosened upon the bolt, the clamping engagement between the threads of the nut and the threads of the bolt is relaxed somewhat so that the nut may be readily removed from the bolt. Due to the elastic qualities of the locknut, the locking portion 16 will have a tendency to return to its original form. By reason of this characteristic, the nut may be repeatedly loosened and tightened without undue wear and without damage to the usual corrosion-resistant plating or coating ordinarily formed on the threaded surface of the coacting bolt.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A locknut comprising a body having an internal thread embodying leading and following faces engageable with a running clearance over the leading and following faces of threads on a coacting bolt, said body having internal and external annular grooves disposed in a common plane and dividing the nut into two portions connected by a thin deformable web adjacent said internal thread, a bead formed on the end of one of said portions adjacent the periphery of the nut, said bead being adapted to engage an abutting surface to expand said internal groove and contract said external groove whereby the leading faces of the threads of the bead carrying portion of the nut will intimately engage the following faces of the threads of the bolt and the following faces of the threads on the other portion of the nut will intimately engage the leading faces of the threads of the bolt.

2. A locknut comprising a body having an internal thread embodying leading and following faces engageable with a running clearance over the leading and following faces of threads on a coacting bolt, said body having internal and external annular grooves disposed in a common plane and dividing the nut into two portions connected by a thin deformable web adjacent said internal thread, a bead formed on the end of one of said portions adjacent the periphery of the nut, said bead engageable with an abutting surface for deforming said web to effect the intimate engagement of a face of the thread of the bead carrying portion of the nut with a face of the thread of the bolt opposite to that face of the thread of the bolt engaged by the face of the thread in the other portion of the nut.

BERT G. CARLSON.